US010260583B2

(12) United States Patent
Dupuis

(10) Patent No.: US 10,260,583 B2
(45) Date of Patent: Apr. 16, 2019

(54) BRAKE DISK

(71) Applicant: Robert Bosch GmbH, Stuttgart (DE)

(72) Inventor: Vincent Dupuis, Colomiers (FR)

(73) Assignee: Robert Bosch GmbH, Stuttgart (DE)

( * ) Notice: Subject to any disclaimer, the term of this patent is extended or adjusted under 35 U.S.C. 154(b) by 569 days.

(21) Appl. No.: 13/712,510

(22) Filed: Dec. 12, 2012

(65) Prior Publication Data

US 2013/0161132 A1 Jun. 27, 2013

(30) Foreign Application Priority Data

Dec. 23, 2011 (DE) ........................ 10 2011 089 864

(51) Int. Cl.
*F16D 66/02* (2006.01)
*F16D 65/12* (2006.01)

(52) U.S. Cl.
CPC ............. *F16D 66/02* (2013.01); *F16D 65/12* (2013.01); *F16D 65/127* (2013.01); *F16D 2200/006* (2013.01); *F16D 2200/0013* (2013.01); *F16D 2250/0046* (2013.01)

(58) Field of Classification Search
CPC .. F16D 2250/0046; F16D 66/02; F16D 66/00; F16D 2069/004; F16D 65/127
USPC ..................................... 188/1.11 W, 218 XL
See application file for complete search history.

(56) References Cited

U.S. PATENT DOCUMENTS

| | | | | |
|---|---|---|---|---|
| 4,049,084 | A * | 9/1977 | Beemer et al. | 188/1.11 R |
| 6,186,293 | B1 * | 2/2001 | Beer et al. | 188/218 XL |
| 6,308,803 | B1 * | 10/2001 | Oberti | 188/1.11 W |
| 6,457,566 | B1 * | 10/2002 | Toby | 188/1.11 W |
| 6,631,791 | B2 * | 10/2003 | Moore et al. | 188/1.11 W |
| 7,219,776 | B2 * | 5/2007 | Bauer et al. | 188/218 XL |
| 7,261,192 | B2 * | 8/2007 | Khambekar et al. | 188/218 XL |
| 2002/0117360 | A1 | 8/2002 | Toby | |
| 2004/0031652 | A1 * | 2/2004 | Khambekar et al. | 188/218 XL |
| 2005/0183909 | A1 * | 8/2005 | Rau et al. | 188/218 XL |
| 2013/0008748 | A1 * | 1/2013 | Lembach et al. | 188/1.11 W |

FOREIGN PATENT DOCUMENTS

| | | | | |
|---|---|---|---|---|
| CN | 103119317 | A | 5/2013 | |
| DE | 4002695 | A1 * | 8/1991 | F16D 65/12 |
| DE | 102005032638 | A1 * | 1/2007 | |
| DE | 102010013343 | A1 * | 10/2011 | |
| EP | 2 588 775 | A2 | 5/2013 | |
| FR | 2927391 | A1 * | 8/2009 | F16D 66/02 |
| JP | H01121733 | * | 8/1989 | F16D 66/02 |
| JP | 2013-527897 | A | 7/2013 | |
| WO | 2011124312 | A2 | 10/2011 | |

* cited by examiner

*Primary Examiner* — Xuan Lan Nguyen
(74) *Attorney, Agent, or Firm* — Maginot, Moore & Beck LLP

(57) ABSTRACT

A brake disk has a wear-reducing surface coating including a wear indicator and a friction ring. The wear indicator is a raised portion on the friction ring and is underneath the surface coating. The raised portion runs around the friction ring in the form of a wavy line, for example. The raised portion has a height which corresponds to a wear limit.

3 Claims, 1 Drawing Sheet

3
5
6
1
2, 4
5
6

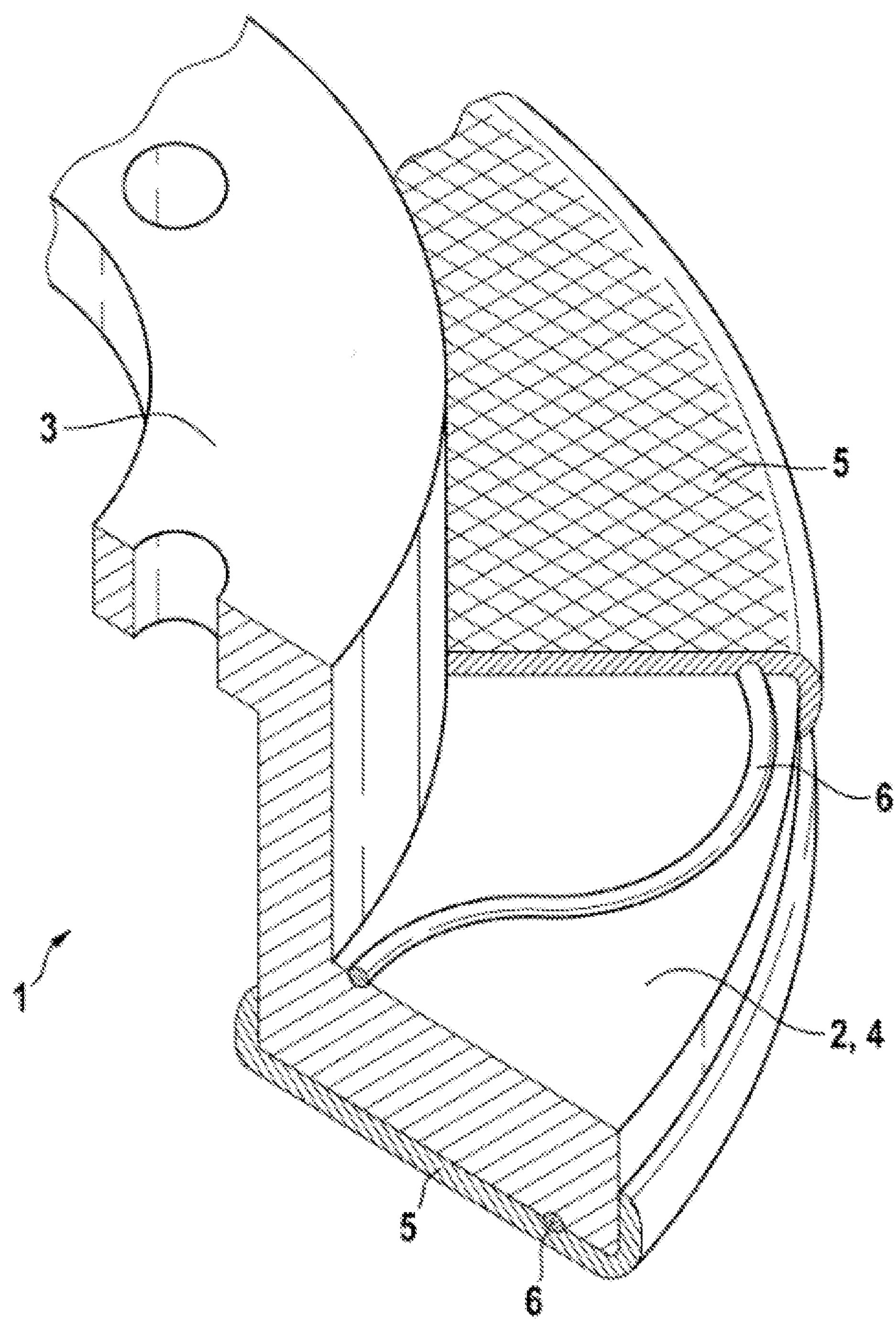
3
5
6
1
2, 4
5
6

BRAKE DISK

This application claims priority under 35 U.S.C. § 119 to patent application no. DE 10 2011 089 864.6, filed on Dec. 23, 2011 in Germany, the disclosure of which is incorporated herein by reference in its entirety.

BACKGROUND

The disclosure relates to a brake disk having the features described below, of the kind used for disk brakes of motor vehicles, for example.

To reduce wear and thereby increase service life, there is a known practice of providing brake disks with a wear-reducing surface coating. Wear-reducing surface coatings are applied thermally by flame spraying or arc spraying, for example, and contain chromium carbides and/or tungsten carbides, for example. The brake disk can be provided with the surface coating all over, although surface coating on friction surfaces of the brake disk is sufficient. Friction surfaces are the brake disk surfaces in the form of perforated circular disks against which the friction brake linings are pressed during braking. Apart from reducing wear, a surface coating can serve to protect against corrosion and/or improve braking properties of a brake disk.

In the case of uncoated brake disks, a brake disk thickness can be measured in order to check whether a wear limit has been reached and to assess whether the brake disk must be replaced. In the case of surface-coated brake disks, that is not possible because the surface coating is too thin and a thickness measurement, using a vernier caliper for example, would therefore be too inaccurate. Moreover, a brake disk has a thickness tolerance in its production, and this may be greater than the thickness of the surface coating. As a result, a new brake disk of which the thickness is at a lower production tolerance limit may be thinner, including its surface coating, than a brake disk, the thickness of which is at an upper production tolerance limit and the surface coating of which is worn.

Uncoated brake disks having a wear indicator or a plurality of wear indicators are also known. Such wear indicators consist of depressions, e.g. slots or holes, in the friction surfaces of the brake disk. If the depressions begin to disappear due to wear on the brake disk, this is a sign that the brake disk is worn and must be replaced.

SUMMARY

The brake disk according to the disclosure, having the features described below, has a surface coating and a wear indicator, which becomes visible when a wear limit of the brake disk is reached. The surface coating can cover the entire brake disk but a surface coating on the friction surface/s of the brake disk is sufficient. The wear limit is a defined minimum or residual thickness which the surface coating must have or upon the reaching or undershooting of which the brake disk must be replaced. Some other definition of the wear limit is not excluded by the disclosure. The wear indicator of the brake disk according to the disclosure is situated in a lower region of the surface coating, i.e. a region close to the brake disk, and the height thereof above the brake disk corresponds to the wear limit. In the case of a new brake disk, the wear indicator is covered by the surface coating. If the surface coating is worn down to the wear limit by braking, the wear indicator becomes visible.

The description below relates to advantageous embodiments and developments of the disclosure.

BRIEF DESCRIPTION OF THE DRAWING

The disclosure is explained in greater detail below with reference to an illustrative embodiment shown in the drawing. The single figure shows a perspective partial view of a brake disk according to the disclosure.

DETAILED DESCRIPTION

The brake disk 1 according to the disclosure, of which the drawing shows a partial view, has a brake ring 2 in the form of a perforated circular disk and a cup-shaped hub 3, which is integral and concentric with the brake ring 2. Faces of the brake ring 2, which are in the form of circular perforated disks, form friction surfaces 4 of the brake disk 1, against which friction brake linings (not shown) of a brake disk (likewise not shown) are pressed during braking. The friction ring 2 can be taken to be the actual brake disk. In the illustrative embodiment, the brake disk 1 is composed of metal, namely of gray cast iron, i.e. cast iron containing graphite flakes. The brake disk 1 can also be composed of steel or some other metal or even of a non-metallic material.

The friction surfaces 4 of the brake disk 1 have a friction-reducing surface coating 5. The surface coating 5 covers at least the friction surfaces 4 but can also cover more, and even the entire brake disk 1. The surface coating 5 is applied thermally, e.g. by flame spraying or arc spraying. It has a matrix of metal, e.g. composed of nickel or cobalt, in which carbide particles, in particular metal-like carbides, in the illustrative embodiment tungsten and/or chromium carbides, are embedded. The thickness of the surface coating 5 is shown on an exaggerated scale in the drawing, being a few tenths of a millimeter thick. The disclosure is not restricted to the material described, the manner of application and the thickness of the surface coating 5 but also includes all possible surface coatings 5, the wear resistance of which is greater than that of the brake disk 1. If braking properties, for example, rather than wear resistance are the primary concern, it is even possible to consider a surface coating 5, the wear resistance of which is not greater than that of the brake disk 1.

Wear indicators 6 are applied to the friction surfaces 4 of the brake ring 2, underneath the surface coating 5. The wear indicators 6 are raised portions, the height of which corresponds to a wear limit of the surface coating 5. The wear limit is a defined minimum thickness which the surface coating 5 must have and upon the reaching or undershooting of which due to wear the brake disk 1 must be replaced. In the depicted illustrative embodiment, the wear indicator 6 is a raised portion in the form of a wavy line with a circular cross section, which runs around the brake ring 2 and alternately approaches an inner edge and an outer edge of the brake ring 2. Different wear indicators are also possible, e.g. points or pictograms or inscriptions such as "wear limit reached", "brake disk must be replaced", "disk exchange required", these having a height corresponding to the wear limit like the depicted wear limit 6 in the form of a line.

The wear indicator 6 is applied before the surface coating 5. The wear indicator 6 can be produced during the production of the brake disk 1 itself, namely during the casting of the brake disk 1 by means of depressions in surfaces of a casting mold that form negative impressions of the wear indicator 6. Forming of the brake disk 1, e.g. by an embossing-type process, is furthermore conceivable for the production of the raised portion forming the wear indicator 6. Further possibilities are application by adhesive bonding, build-up welding or chemical deposition of the wear indicator 6, or even production by laser machining of the friction surface 4 of the brake disk 1. Another possibility for the production of a wear indicator is shot peening or some other method which gives a surface of the friction surfaces 4 a structure with raised portions and depressions. Forming, e.g. pressing or machining, by grinding for example, is used to make the raised portions all the same height, corresponding to the wear limit of the surface coating 5. If the raised portions of the surface structure of the friction surface 4 become visible due to abrasion of the surface coating 5, this indicates that the wear limit of the brake disk 1 has been reached. The wear indicator can also comprise a depression in the brake ring 2 which is filled with the material of the surface coating 5 or some other material. The wear indicator becomes visible when the surface coating 5 has been abraded by wear, because the wear indicator has a different appearance from the gray cast iron brake ring 2. The enumeration of possibilities for applying the wear indicator 6 is illustrative and in no way exhaustive.

During the use of the brake disk 1, the surface coating 5 is abraded by wear. If the abrasion reaches the defined wear limit, i.e. the height of the wear indicator 6, the wear indicator 6 becomes visible, indicating that the wear limit of the brake disk 1 has been reached.

What is claimed is:

1. A brake disk comprising:

a friction surface that defines:

at least one integral raised region configured to protrude into a surface coating, the surface coating provided with an initial thickness and having a minimum operating thickness that is less than the initial thickness and that defines a wear limit of the surface coating, the at least one integral raised region further configured to act as a wear indicator that becomes visible to an observer when the surface coating is worn down to the minimum operating thickness, the wear indicator defined by a substantially wavy annulus shape that is alternatingly adjacent an inner edge and an outer edge of the brake disk, wherein:

the at least one integral raised region has a height which corresponds to the wear limit; and the surface coating covers said friction surface and said height of said at least one integral raised region; and at least one further integral raised portion configured to protrude into a further surface coating, the further surface coating provided with a further initial thickness and having a further minimum operating thickness that is less than the further initial thickness and that defines a wear limit of the further surface coating, the at least one further integral raised portion further configured to act as a further wear indicator that becomes visible to an observer when the further surface coating is worn down to the further minimum operating thickness, the further wear indicator defined by a substantially wavy annulus shape that is alternatingly adjacent the outer edge and the inner edge of the brake ring such that, in a circular direction, as the wear indicator approaches the inner edge and the outer edge, the further wear indicator respectively approaches the outer edge and the inner edge, wherein:

the at least one further integral raised region has a height which corresponds to the further wear limit;

the further surface coating covers said friction surface and said height of said at least one further integral raised region; and the at least one further integral raised region is raised such that the further wear indicator has a substantially semi-circular cross section;

wherein the at least one further integral raised region and the further wear indicator are on a side of the brake disk facing away from the wear indicator.

2. A brake disk comprising:

a first side that defines a first friction surface, an integral region of the first friction surface raised by a height from the first side to define a first wear indicator, the first wear indicator having a substantially wavy annulus shape that alternatingly approaches an inner edge and an outer edge of the brake disk, and the height corresponding to a minimum operating thickness of a surface coating material, such that the first wear indicator is configured to become exposed as surface coating material in a region of the first wear indicator is worn down to the minimum operating thickness; and a second side opposite the first side that defines a second friction surface facing away from the first friction surface, an integral region of the second friction surface raised by the height from the second side to define a second wear indicator, the second wear indicator having a substantially wavy annulus shape that is rotationally offset from the shape of the first wear indicator such that as the first wear indicator alternatingly approaches the inner edge and the outer edge of the brake disk, the second wear indicator alternatingly approaches the outer edge and the inner edge of the brake disk, respectively, and the height corresponding to the minimum operating thickness of the surface coating material, such that the second wear indicator is configured to become exposed as surface coating material in a region of the second wear indicator is worn down to the minimum operating thickness.

3. The brake disk of claim 2, wherein:

the integral region of the first friction surface defining the first wear indicator is the only region of the first friction surface raised from the first side; and the integral region of the second friction surface defining the second wear indicator is the only region of the second friction surface raised from the second side.

* * * * *